(12) United States Patent
Choi et al.

(10) Patent No.: US 7,003,199 B2
(45) Date of Patent: Feb. 21, 2006

(54) TUNABLE DISPERSION COMPENSATOR FOR OPTICAL COMMUNICATION SYSTEM

(75) Inventors: Sun-Min Choi, Goyang-si (KR); Jun-Kye Bae, Seongnam-si (KR); Jun-Hee Kim, Seoul (KR); Young-Geun Han, Seoul (KR); Sang-Hyuck Kim, Seoul (KR); Sang-Bae Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 11/025,828

(22) Filed: Dec. 27, 2004

(65) Prior Publication Data
US 2005/0169578 A1 Aug. 4, 2005

(30) Foreign Application Priority Data
Dec. 26, 2003 (KR) ............... 10-2003-0097073

(51) Int. Cl.
G02B 6/34 (2006.01)
(52) U.S. Cl. .................................... 385/37; 385/27
(58) Field of Classification Search ........... 385/37, 385/27
See application file for complete search history.

(56) References Cited

U.S. PATENT DOCUMENTS

| | | | |
|---|---|---|---|
| 3,916,348 A * | 10/1975 | Toda et al. ............ 333/155 |
| 5,469,520 A * | 11/1995 | Morey et al. ........... 385/37 |
| 5,841,920 A * | 11/1998 | Lemaire et al. ......... 385/37 |
| 5,920,663 A * | 7/1999 | Dragone ............... 385/15 |
| 5,978,539 A * | 11/1999 | Davies et al. .......... 385/129 |
| 5,999,671 A * | 12/1999 | Jin et al. .............. 385/37 |
| 6,044,189 A * | 3/2000 | Miller ................. 385/37 |
| 6,144,789 A * | 11/2000 | Engelberth et al. ...... 385/37 |
| 6,175,674 B1 * | 1/2001 | Lin ................... 385/37 |
| 6,181,851 B1 * | 1/2001 | Pan et al. ............. 385/37 |
| 6,218,661 B1 * | 4/2001 | Schroeder et al. ...... 250/227.14 |
| 6,360,042 B1 * | 3/2002 | Long .................. 385/37 |
| 6,366,721 B1 * | 4/2002 | Hu et al. .............. 385/37 |
| 6,374,015 B1 * | 4/2002 | Lin ................... 385/37 |
| 6,510,272 B1 * | 1/2003 | Wiegand .............. 385/136 |
| 6,643,066 B1 * | 11/2003 | Couillard et al. ........ 359/573 |
| 6,778,735 B1 * | 8/2004 | Miller et al. ........... 385/37 |
| 2003/0059163 A1* | 3/2003 | Boettcher et al. ........ 385/37 |

* cited by examiner

Primary Examiner—Ellen E. Kim
(74) Attorney, Agent, or Firm—Jones Day

(57) ABSTRACT

The present invention relates to a tunable distribution compensator, including: an optical fiber having a chirped optical fiber grating; first and second frames having first and second stepped portions, respectively, wherein the first stepped portion is symmetrically faced to the second stepped portion; a first metal plate with a predetermined length for attaching the optical fiber; a second metal plate seated on the first and second stepped portions; and a bending unit connected to the first and second frames and the second metal plate for symmetrically bending the optical fiber.

10 Claims, 4 Drawing Sheets

TUNABLE DISPERSION COMPENSATOR
FOR OPTICAL COMMUNICATION SYSTEM

RELATED APPLICATIONS

This application claims priority of Korean Patent Application No. 10-2003-97073 filed on Dec. 26, 2003.

FIELD OF THE INVENTION

The present invention generally relates to a dispersion compensator in an optical communication system, and more particularly to a tunable dispersion compensator for compensating the dispersion of a pulse of an optical signal by a controlling bend induced on chirped optical fiber gratings.

BACKGROUND OF THE INVENTION

Optical communication technology has been improving rapidly due to the development of optical fiber technologies and light sources such as semiconductor lasers. In particular, wavelength division multiplexing, in which optical signals having different wavelengths are transmitted through a single mode fiber, has been established as a key technology in optical communication. Further, the recent development of an Erbium-doped fiber amplifier ("EDFA") resolves the problem of energy loss in optical signals caused by long distance transmission.

In the technical field of optical communication, a wavelength band ranging from 1,530 to 1,565 nm is commonly employed. In cases where optical signals in the wavelength band are multiplexed and transmitted through a single optical fiber, each of the optical signals has a different refraction index with respect to each wavelength. The different refractive indices to the optical fiber depending on the wavelength causes dispersion, in which the optical signals through a single optical fiber over a long distance become spread along the time axis. As the required transmission distance becomes longer, the dispersion effect becomes even more prominent to the degree that the transmitted optical signals overlap each other. Thus, it is difficult to discriminate the optical signals at the receiving end of the optical transmission system.

A tunable dispersion compensator adopting an optical fiber grating has been mainly used to compensate for the dispersion of these optical signals. Such dispersion compensator facilitates a connection to an optical cable, provides low transmission loss, and offers no nonlinear phenomenon of the optical signals. For instance, if a central wavelength of the optical signals is $\lambda_1$, then the optical signals consist of a plurality of wavelengths that exist within the range from $\lambda_1-\delta$ nm to $\lambda_1+\delta$ nm In such a case, it is known that the longest wavelength (i.e., $\lambda_1+\delta$ nm) of the optical signals causes the most severe dispersion along the time axis. This is due to a slower transmission rate than other wavelengths when its transmission distance becomes longer. On the other hand, the smallest wavelength (i.e., $\lambda_1-\delta$ nm) of the optical signals causes the lowest dispersion due to a more rapid transmission rate than other wavelengths even though its transmission distance becomes longer. Consequently, in order to compensate for the dispersion of said longest wavelength of the optical signal pulses, it may be desirable to reduce a reflection path in the interior of the optical fiber grating. In order to compensate the dispersion of the shortest wavelength, however, it may be preferable to extend the reflection path within the optical fiber grating. This is to compensate the dispersion of the optical signal pulses caused by the long distance transmission.

Generally, the methods of controlling the dispersion value with the tunable dispersion compensator may be classified into two methods. According to the first method, (1) the optical fiber grating is divided into several or dozens of parts, and (2) the refractive index of the grating is changed by heating and cooling each part at a different temperature in order to adjust the dispersion value. However, the variation of refractive indices of the grating parts becomes discontinuous due to the repeated heating and cooling. Further, unexpected variations of refractive indices on adjacent parts may occur due to thermal conductions. Thus, the performance of the tunable dispersion compensator becomes degraded such that it cannot be frequently used.

According to the second method, (1) optical fiber grating is attached onto a surface of a plate, (2) the plate is bent to change the period of the grating, and (3) the dispersion value is adjusted due to the changed period. A bending process is performed in the second method. More specifically, one end of the metal plate, to which the chirped optical fiber grating is attached, becomes fixed, while the other end of the metal plate is moved so that the metal plate can be bent. Therefore, the period of the chirped optical fiber grating may vary due to the tensile force and contractile force induced by bending the metal plate. In other words, the period of the optical fiber grating becomes longer when the tensile force is induced, while the period of the optical fiber grating becomes shorter when the contractile force is induced. The dispersion value, which is defined as a variation of the group delay time of wavelengths of the optical signals, can be therefore adjusted by varying the period of the optical fiber grating.

However, the second method is deficient in that a central wavelength of an optical signal, which is reflected from the chirped optical fiber, varies in accordance with the changed central period of the chirped optical fiber gratings. This is because only one end of the metal plate is moved in the conventional dispersion compensator in order to vary the period of the optical fiber grating.

SUMMARY OF THE INVENTION

It is an object of the present invention to provide a tunable dispersion compensator to easily perform control of dispersion compensation and not change the central period of a chirped optical fiber grating.

The present invention provides a tunable distribution compensator comprising: an optical fiber having a chirped optical fiber grating; first and second frames having first and second stepped portions, respectively, wherein the first stepped portion is symmetrically faced to the second stepped portion; a first metal plate with a predetermined length for attaching the optical fiber; a second metal plate seated on the first and second stepped portion; and a bending unit connected to the first and second frames and the second metal plate for symmetrically bending the optical fiber.

BRIEF DESCRIPTION OF DRAWINGS

The above object and features of the present invention become more apparent in the following description of the preferred embodiments given in conjunction with the accompanying drawings.

DETAILED DESCRIPTION OF THE PRESENT INVENTION

The preferred embodiment of the present invention is described in detail with reference to FIGS. 1 and 4.

Figure 1:
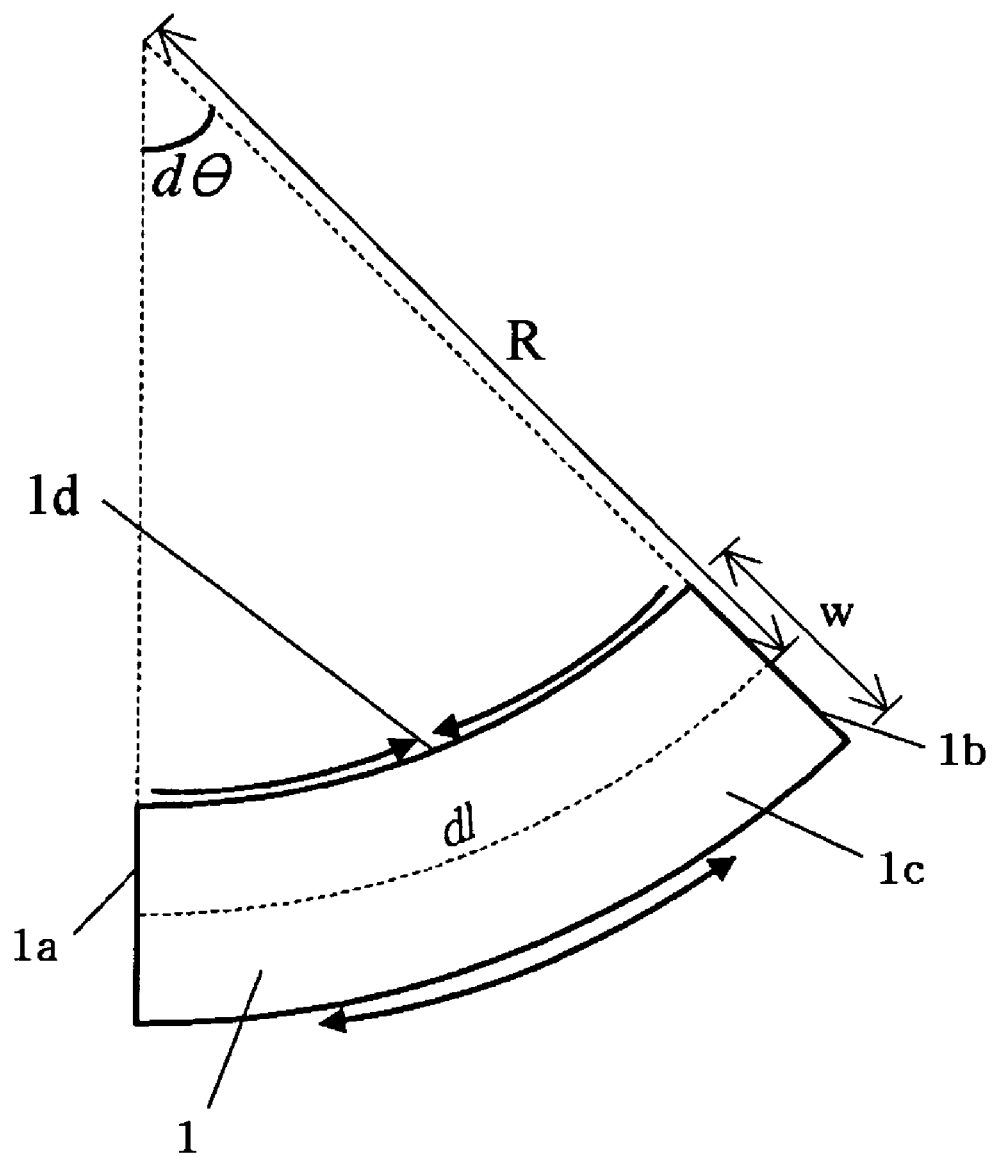
FIG. 1 is a diagram illustrating a tensile force and a contractile force induced by bending a metal plate.

FIG. 1 shows a tensile force and a contractile force induced on a metal plate 1, which has predetermined width and length when the metal plate 1 is bent. That is, assuming that identical forces are applied to both ends of the metal plate 1, the tensile and contractile forces are induced on a front side 1c and a back side 1d of the metal plate 1, respectively. In FIG. 1, "R" denotes the radius of curvature of the bent metal plate 1, "w" denotes the width of the metal plate 1, "dθ" denotes the angle variation quantity according to the curvature of the bent metal plate 1, and "dl" denotes the length variation quantity of the bent metal plate 1.

After attaching the chirped optical fiber grating to the front side 1c of the metal plate 1, if the metal plate 1 is bent as shown in FIG. 1, the tensile force is applied to the chirped optical fiber grating so that a period of said optical fiber grating becomes longer. On the other hand, if the metal plate 1 is bent as shown in FIG. 1 after attaching the chirped optical fiber grating to the back side 1d of the metal plate 1, the contractile force is applied to the chirped optical fiber grating. In such a case, the period of the chirped optical fiber grating becomes shorter.

Figure 2:
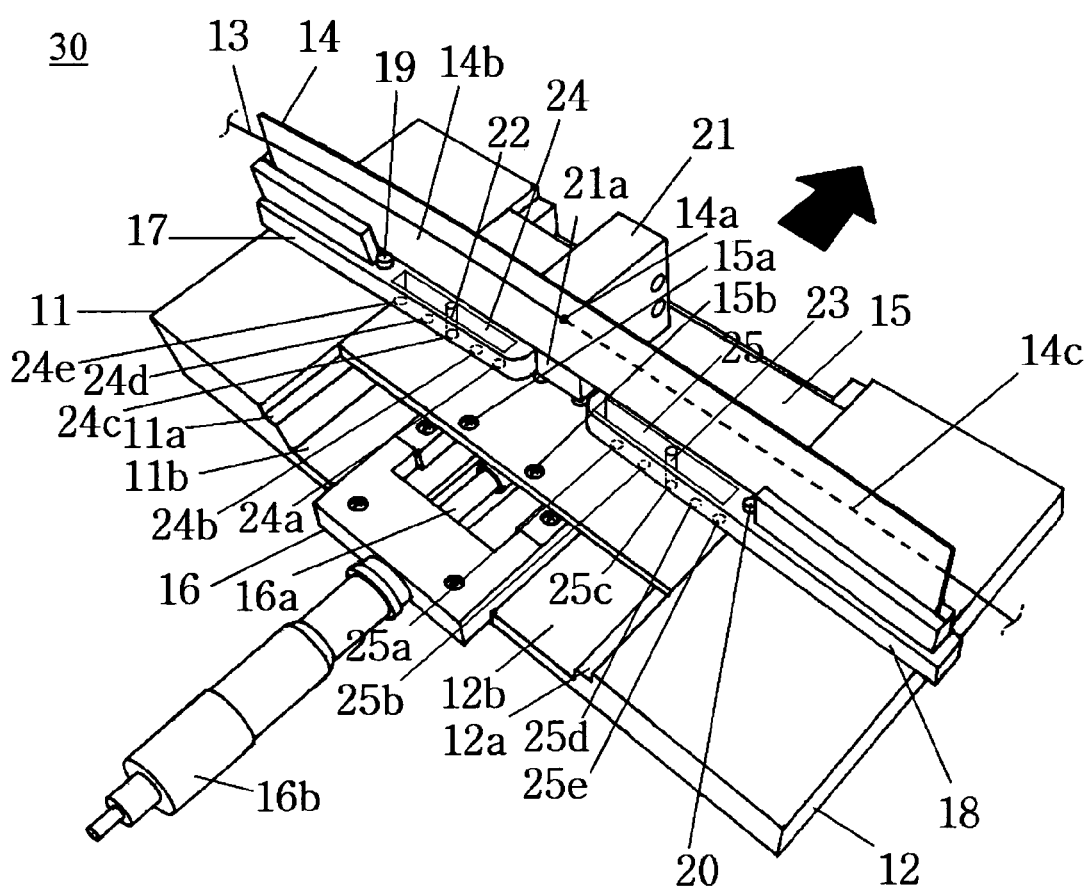
FIG. 2 is a schematic diagram of a tunable dispersion compensator constructed in accordance with an embodiment of the present invention.

FIG. 2 is a schematic diagram illustrating a tunable dispersion compensator constructed in accordance with the preferred embodiment of the present invention.

As shown in FIG. 2, the tunable dispersion compensator includes first and second frames 11 and 12, an optical fiber 13 having a chirped optical fiber grating attached to a metal plate 14, a movable metal plate 15, and a translator 16. The first frame 11 has two downwardly stepped portions 11a and 11b, while the second frame 12 also has two downwardly stepped portions 12a and 12b. The first frame 11 is symmetrically positioned away from the second frame 12 with a predetermined distance to face the stepped portions 11a and 11b toward the stepped portions 12a and 12b. Both ends of the metal plate 14 are held by first and second holders 17 and 18, which are placed symmetrically to each other. Such holders 17 and 18 are pivotally connected to top surfaces of the first and second frames 11 and 12 by means of first and second hinge pins 19 and 20, respectively.

The translator 16 is placed between the first and second frames 11 and 12. The movable metal plate 15 is seated on the stepped portions 11a and 12a so as to be moved onto the stepped portions 11a and 12a over the translator 16. The holders 17 and 18 have slots 24 and 25, while the movable plate 15 has first and second pinholes 24a to 24e and 25a to 25e. The pinholes 24a to 24e and 25a to 25e are opened by the slots 24 and 25, respectively. The holders 17 and 18 are coupled to the movable metal plate 15 by inserting pins 22 and 23 to one of each pinhole 24a to 24e and 25a to 25e by passing the slots 24 and 25, respectively. A supporter 21 is positioned at the center of the movable metal plate 15 so as to prevent the center portion of the optical fiber 13 from being disproportionately bent.

The chirped optical fiber grating has a linear grating period according to a predetermined chirping rate. The optical fiber 13 of a predetermined length comprises a grating having a central period of the chirped optical fiber grating for compensating the distribution by reflecting an optical signal pulse having a central wavelength inserted in the optical fiber 13.

The optical fiber 13 passes through a slit 14a exiting at the center of the metal plate 14 so that a portion of the optical fiber 13 is attached to a front side 14b of the metal plate 14, while another portion of the optical fiber 13 is attached to a rear side 14c of the metal plate 14. The optical fiber (solid line) attached to the front side 14b of the metal plate 14 has a chirped optical fiber grating whose grating period is gradually shortened toward one end of the optical fiber 13. The optical fiber (dashed line) attached to the rear side 14c of the metal plate 14 has a chirped optical fiber grating whose grating period is gradually lengthened toward the other end of the optical fiber 13.

Generally, the metal plate 14 attaching the optical fiber 13 is made of metal having a predetermined thickness whose restoring force is high and mechanical ability is hardly varied against repeated mechanical forces. The center of the optical fiber 13 is positioned at the center of the metal plate 14 in which the slit 14 exits. The supporter 21 is also positioned at the center of the movable metal plate 15. This should be adjusted so that centers of one side 21a of the supporter 21, the metal plate 14 and the movable metal plate 15 are placed on the same straight line which is vertical to the movable metal plate 15.

The optical fiber 13 is bent differently according to the positions of the pins 22 and 23 inserted into each pinhole 24a to 24e and 25a to 25e. The pins 22 and 23 are symmetrically inserted into the pinholes 24a to 24e and 25a to 25e such that both sides of the metal plate 14 are symmetrically bent.

The movable metal plate 15 whose both ends are seated on the stepped portions 11a and 12a is moved onto and along the stepped portions 11a and 12a by the translator 16 for controlling a moving direction of the movable metal plate 15. The translator 16, which becomes fixed to the movable metal plate 15 by screws 15a and 15b, includes a single moving shaft 16a and a rotation bar 16b. In order to operate the tunable distribution compensator 30, if an operator rotates the rotation bar 16b, the translator 16 is moved along the single moving shaft 16a so that the movable metal plate 15, which is fixed to the translator 16, moves onto and along the stepped portions 11a and 12a.

The bend of the optical fiber 13, which is attached onto the metal plate 14 of the tunable distribution compensator 30, is explained below.

First, if the rotating bar 16b of the translator 16 is rotated clockwise, the moving shaft 16a is moved in the direction of the arrow denoted in FIG. 2. This is so that the movable metal plate 15, which is fixed to the translator 16, moves onto and along the stepped portions 11a and 12a.

Since the first and second holders 17 and 18 are connected to the movable metal plate by the pins 22 and 23, as the movable metal plate 15 is moved along the stepped portions 11a and 12a in the direction of the arrow, the first holder 17 is rotated counterclockwise on an axis of the first hinge pin 19 and the second holder 18 is rotated clockwise on an axis of the second hinge pin 20. Rotation ranges of the first and second holders 17 and 18 on axes of the hinge pins 19 and 20 are determined according to where the pins 22 and 23 are inserted among the pinholes 24a to 24e and 25a to 25e. If the pins 22 and 23 are inserted into the pinholes positioned closest to the holders 17 and 18 (e.g., 24e and 25e), they provide the minimum rotation range for rotating the first and second holders 17 and 18. On the other hand, if the pins 22 and 23 are inserted into the pinholes positioned farthest to the holders 17 and 18 (e.g., 24a and 25a), they provide the maximum rotation range for the holders 17 and 18.

Both sides of the metal plate 14 pivotally connected to the holders 15 and 16 by the hinge pins 19 and 20 are symmetrically bent on the axes of the supporter 21 due to the rotation of the first and second holders 15 and 16. As the optical fiber 13 attached to the front side 14b and the rear side 14c of the metal plate 14 is also symmetrically bent at the same time, the contractile force is induced on the chirped optical fiber grating attached to the front side 14b of the metal plate 14 and the tensile force is induced on the chirped optical fiber grating attached to the rear side 14c of the metal plate 14. Therefore, the grating period of the chirped optical fiber grating attached to the front side 14b of the metal plate 14 is shortened, while that of the chirped optical fiber grating attached to the front side 14b of the metal plate 14 is lengthened.

Accordingly, as the grating period of the chirped optical fiber grating is varied by bending the optical fiber 13 in a ∩ shape, the reflection paths of the optical signal pulses having different wavelengths inserted in the optical fiber 13 are adjusted so that the distribution of the optical signal is compensated.

Even if the metal plate 14 and the optical fiber 13 are bent in the ∩ shape, the centers of the optical fiber 13, the metal plate 14, the movable metal plate 15 and one side 21a of the supporter 21 do not change. The tensile force and contractile force, which are symmetrically induced on the chirped optical fiber grating in the optical fiber 13, are therefore canceled at the center of the chirped optical fiber grating. As a result, the central period of the chirped optical fiber grating in the optical fiber 13 for compensating distribution of the optical signal pulse having a central wavelength inserted into the optical fiber 13 is not varied, whereby a shift in the central wavelength configuring the optical signal pulse can be suppressed.

For sake of convenience, although only one optical fiber 13 attached to the metal plate 14 is described as an example of the present invention, a plurality of optical fibers having a plurality of chirped optical fiber gratings can be used.

Figure 3:
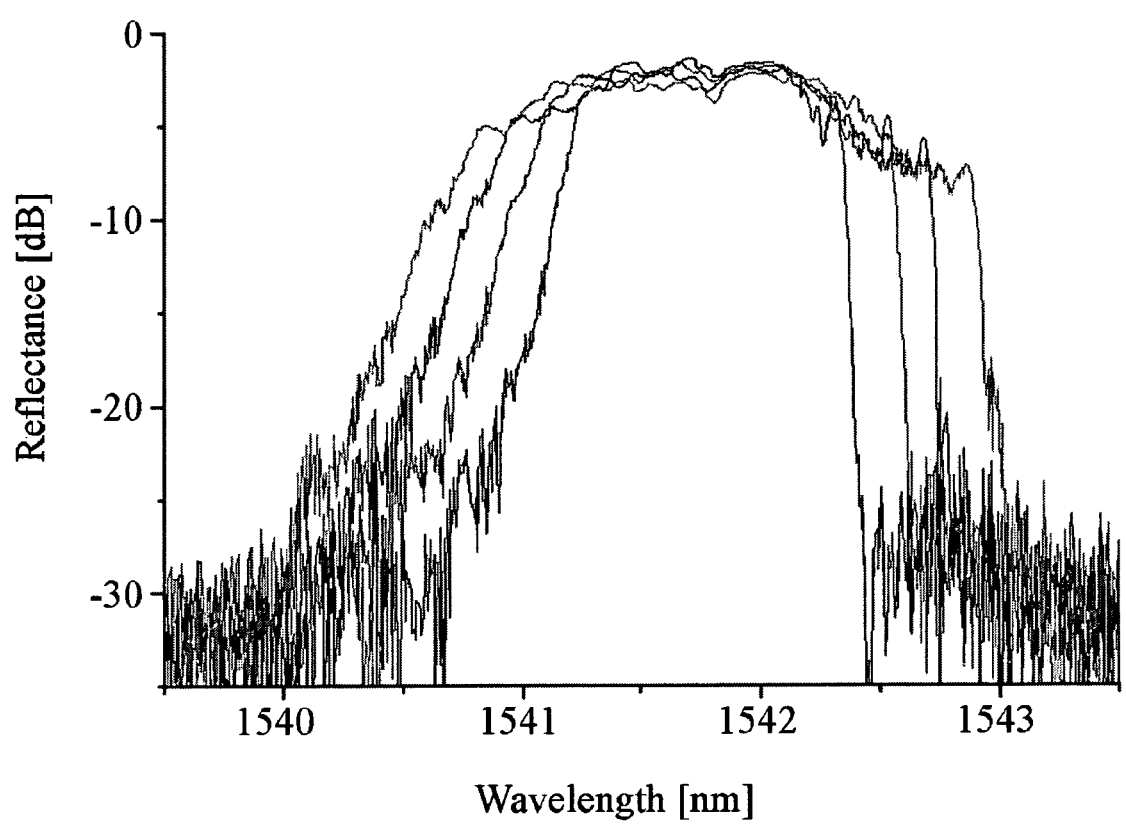
FIG. 3 is a graph showing a reflection spectrum of a chirped optical fiber grating constructed in accordance with the present invention.

FIG. 3 is a graph showing a reflection spectrum of the chirped optical fiber grating due to bending of the optical fiber having the chirped optical fiber grating. As the optical fiber is bent more and more heavily, the chirping rate of the optical fiber is largely varied so that the band variation of the optical fiber is gradually increased.

Figure 4:
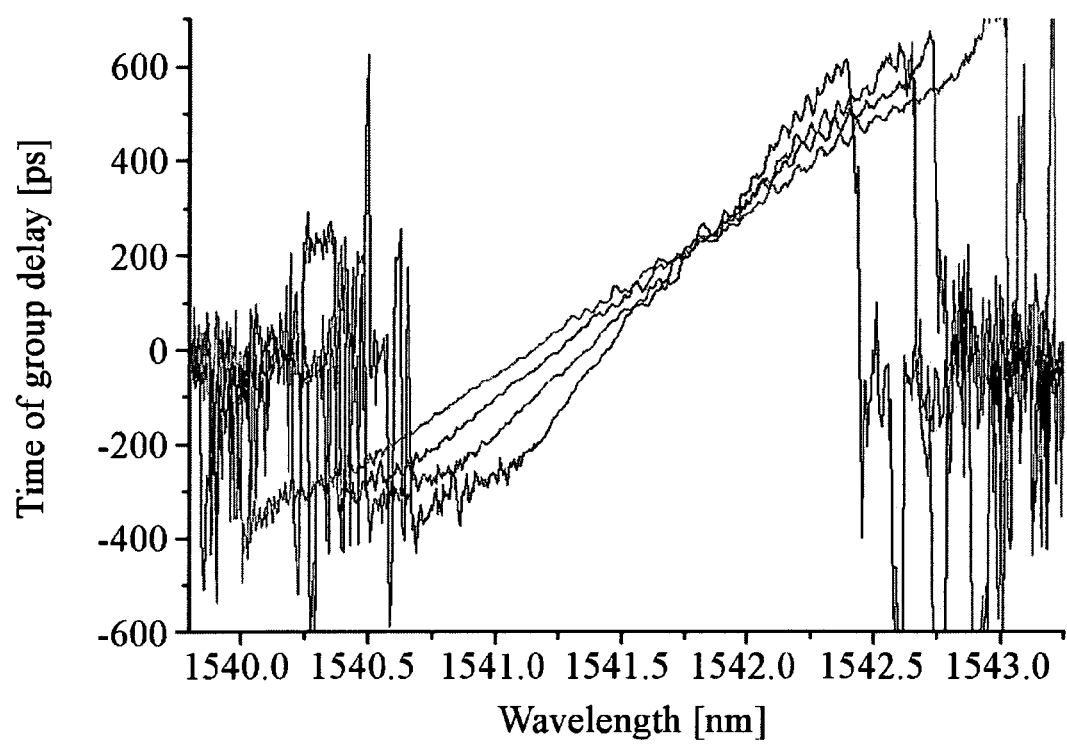
FIG. 4 is a graph showing variation of dispersion values of a chirp optical fiber constructed in accordance with the present invention.

FIG. 4 is a graph showing variation of a distribution value. The distribution value represented with a slope according to the chirping rate variation of the chirped optical fiber grating is continuously varied.

As the tensile and contractile forces induced on the chirped optical grating are controlled by moving the movable metal plate connected to the translator of the tunable distribution compensator, the distribution compensation of the pulses of the optical signal can be carried out by minutely adjusting the reflection paths of the pulses configuring the optical signal and the shift of the central wavelength can be suppressed. Also, since the tensile and contractile forces are easily controlled by rotating the rotation bar of the translator, the distribution value of the chirped optical fiber grating can be continuously adjusted.

The present invention has been described and illustrated with respect to a preferred embodiment of the invention, but it will be apparent to those skilled in the art that variations and modifications are possible without deviating from the broad principles and teachings of the present invention, limited solely by the scope of the claims appended hereto.

What is claimed is:

1. A tunable distribution compensator comprising:
   an optical fiber having a chirped optical fiber grating;
   first and second frames having first and second stepped portions, respectively, wherein the first stepped portion is symmetrically faced to the second stepped portion;
   a first metal plate with a predetermined length for attaching the optical fiber;
   a second metal plate seated on the first and second stepped portions; and
   a bending means connected to the first and second frames and the second metal plate for symmetrically bending the optical fiber.

2. The tunable distribution compensator as recited in claim 1, wherein the optical fiber is attached to first and second planes by passing a slit of a predetermined size exiting at a center of the first metal plate.

3. The tunable distribution compensator as recited in claim 2, wherein the bending means includes:
   a moving means for moving the second metal plate on the first and second stepped portions;
   a supporting means, which is placed on the second metal plate and contacting the second plane of the first metal plate, for supporting the first metal plate to prevent a center of the optical fiber from being bent;
   first and second holding means, which are symmetrically placed on the first and second frames, for holding both ends of the first metal plate;
   first and second connection means for pivotally connecting the first and second holding means to the first and second frames; and
   third and fourth connection means for connecting the first and second holding means to the second metal plate,
   wherein centers of the optical fiber, the first metal plate, the second metal plate and one side of the supporting means exist on the same straight line.

4. The tunable distribution compensator as recited in claim 3, wherein the moving means includes:
   a connecting unit connectable with the second metal plate;
   a rotation bar for determining the moving direction of the second metal plate; and
   a moving shaft for moving the second metal plate along the stepped portions of the first and second frames according to a rotation direction of the rotation bar.

5. The tunable distribution compensator as recited in claim 3, wherein the first and second holding means have first and second slots, respectively, and the second metal plate has first and second pinholes opened by the slots so that the first and second holding means are connected with the second metal plate by inserting pins into each pinhole through the slots.

6. The tunable distribution compensator as recited in claim 5, wherein the first and second holding means are rotated in an opposite direction on axes of the first and second connection means by moving the second metal plate.

7. The tunable distribution compensator as recited in claim 6, wherein rotation ranges of the first and second holding means are determined according to where the first and second pins are inserted among the pinholes.

8. The tunable distribution compensator as recited in claim 7, wherein the first and second pins are symmetrically inserted into the first and second pinholes.

9. The tunable distribution compensator as recited in claim 6, wherein the optical fiber and the first metal plate are symmetrically bent for supporting means.

10. The tunable distribution compensator as recited in claim 9, wherein a tensile force is induced on a portion where the grating period of the chirped optical fiber grating is gradually lengthened, and a contractile force is induced on a portion where the grating period of the chirped optical fiber grating is gradually shortened.

* * * * *